(12) United States Patent
Cipolla et al.

(10) Patent No.: US 9,217,520 B2
(45) Date of Patent: Dec. 22, 2015

(54) METHOD TO MAKE A CURVED TUBULAR ELEMENT IN ORDER TO CONVEY ABRASIVE MATERIALS SUCH AS CONCRETE OR SUCHLIKE, AND CURVED TUBULAR ELEMENT THUS OBTAINED

(75) Inventors: Davide Cipolla, Cantu (IT); Fabio Ferre, Morbegno (IT)

(73) Assignee: CIFA SPA, Senago (IT)

( * ) Notice: Subject to any disclaimer, the term of this patent is extended or adjusted under 35 U.S.C. 154(b) by 95 days.

(21) Appl. No.: 13/813,694

(22) PCT Filed: Aug. 1, 2011

(86) PCT No.: PCT/IB2011/001762
§ 371 (c)(1),
(2), (4) Date: Feb. 1, 2013

(87) PCT Pub. No.: WO2012/017286
PCT Pub. Date: Feb. 9, 2012

(65) Prior Publication Data
US 2013/0126033 A1    May 23, 2013

(30) Foreign Application Priority Data
Aug. 3, 2010  (IT) .............................. MI2010A1483

(51) Int. Cl.
*F16L 9/02* (2006.01)
*B22D 11/00* (2006.01)
*F16L 57/06* (2006.01)
*F16L 43/00* (2006.01)

(52) U.S. Cl.
CPC ................. *F16L 9/02* (2013.01); *B22D 11/006* (2013.01); *F16L 43/00* (2013.01); *F16L 57/06* (2013.01); *F16L 43/001* (2013.01)

(58) Field of Classification Search
CPC .. B22D 11/043; B22D 11/1282; B22D 13/02; B22D 11/006; B29C 45/2701; F16L 1/206; F16L 43/001; F16L 57/06; F16L 9/02; F16L 43/00
USPC ........... 138/143, 177, 178, 36, 112, 116, 171; 164/98; 264/512–515; 249/144
See application file for complete search history.

(56) References Cited

U.S. PATENT DOCUMENTS 2,005,699 A * 6/1935 Gottwald ........................ 285/61
4,199,010 A * 4/1980 McGuth et al. ............... 138/140

(Continued)

FOREIGN PATENT DOCUMENTS

| DE | 166495 | 3/1905 | |
|---|---|---|---|
| EP | 1873440 | 1/2008 | |
| GB | 861030 | * 11/1958 | .............. B28B 21/74 |

OTHER PUBLICATIONS
International Search Report filed in PCT/IB2011/001762.

*Primary Examiner* — Frederick C Nicolas
*Assistant Examiner* — Bob Zadeh
(74) *Attorney, Agent, or Firm* — Rankin, Hill & Clark LLP (57) ABSTRACT

Method to make a curved tubular element in order to convey abrasive materials such as concrete or suchlike, which comprises a first step of making at least a curved component made of a material highly resistant to wear, having an arched transverse development comprised between 90° and 360°, a second step of inserting the curved component into a shaping mold with a molding surface with a shape mating with the outer surface of at least a part of the curved tubular element to be made, so that, together with the molding surface, the curved component defines a casting chamber, and a third step in which material with a low resistance to wear is cast in the casting chamber in order to make, externally to the curved component, at least a part of a tubular body of the curved tubular element.

3 Claims, 5 Drawing Sheets

(56) References Cited

U.S. PATENT DOCUMENTS 4,684,155 A * 8/1987 Davis ............................. 285/16
4,995,427 A * 2/1991 Berchem ....................... 138/155
5,693,284 A * 12/1997 Mukawa ....................... 264/513
6,494,234 B2 * 12/2002 Esser ............................ 138/109

* cited by examiner fig. 2 fig. 3 fig. 1 fig. 4 fig. 5 fig. 10 fig. 8 fig. 9

METHOD TO MAKE A CURVED TUBULAR ELEMENT IN ORDER TO CONVEY ABRASIVE MATERIALS SUCH AS CONCRETE OR SUCHLIKE, AND CURVED TUBULAR ELEMENT THUS OBTAINED

FIELD OF THE INVENTION

The present invention concerns a method to make a curved tubular element, suitable to be connected with other rectilinear or curved elements, and to define a pipe to convey concrete or other abrasive material in the fluid state. In particular, the field of application of the present invention is the building trade, however it may also be used in other industrial fields.

BACKGROUND OF THE INVENTION

In the construction field, it is known to use metal tubular elements of a modular type that are suitably connected to each other to form a pipe that allows to transfer concrete from a container, for example a concrete mixer, to the casting zone, by means of pumping devices.

The tubular elements are connected to each other on each occasion depending on the characteristics of the zone to be reached. In particular, to allow a possible change in direction, the rectilinear tubular elements are connected to curved tubular elements which have standardized angles of longitudinal development, such as for example 15°, 30°, 45°, 60° or 90°.

The curved tubular elements, compared with the rectilinear ones, are more subject to an abrasive action mainly due to the action of the centrifugal force that the concrete exerts on their inner surface, in particular on the most external part, that is, near the extrados, depending on the conveyance speed and the radius of curvature of the tubular element itself.

In particular, near the extrados of the curved tubular element the speed at which the concrete is conveyed is much higher than the speed near the intrados, that is, in the zone with the smallest radius of curvature, and therefore the inner surface of the curved tubular element near the extrados is subject to greater wear.

In particular, the European patent application EP-A-1,873,440, in the name of the Applicant, discloses a curved tubular element that comprises a first tubular part, more external, made of material having a high mechanical resistance, and a second tubular part, disposed inside the first part and made of wear resistant material. In other words, in the known curved tubular element, there are two curved pipes, of different material, one inside the other.

In order to clamp the two tubular parts together, on the outer surface of the second tubular part, near its extrados, spacer elements are made that keep it separate from the first tubular part in order to create a casting chamber which, during the first use of the curved tubular element, is filled with concrete which, once solidified, makes the two tubular parts solid with each other. The known curved tubular element has the disadvantage, however, that it is rather complex to make, is very heavy and very expensive.

Moreover, given the curved conformation of the tubular element, it is difficult to introduce the second tubular part inside the first tubular part due to the need to force both parts.

In order to reduce the force needed for this insertion, in some known solutions, the second tubular part is made in sectors with a circumferential extension, which are inserted individually into the first tubular part and brought close to each other.

However, this known solution does not eliminate all the disadvantages and makes it difficult to produce the element; a further clamping step of the second tubular part with respect to the first is also necessary.

U.S. Pat. No. 4,199,010 describes a solution in which a metal tube for conveying material in particles is lined with a ceramic lining.

Purpose of the present invention is to achieve a curved tubular element for conveying concrete or other abrasive materials in the fluid state, which is reliable, simple to produce, relatively light and economical.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, a method according to the present invention provides to make a curved tubular element for conveying abrasive materials in the fluid state such as concrete or suchlike.

According to the present invention, the method comprises at least:

a first step of making at least a first curved component in the longitudinal direction of the curved tubular element, made of reinforcement material with high resistance to wear, for example carbide or similar, having an arched development of the cross section and an amplitude comprised between 90° and 360°;

a second step of inserting the first curved component in a forming mold having a molding surface with a shape mating with the outer surface of at least a part of the curved element to be made, so that the outer surface of said first curved component defines, together with the molding surface of the forming mold, a casting chamber outside it, a third step in which material with low resistance to wear is cast in the casting chamber, so as to make, outside the first curved component and directly in contact with it, at least a part of a second curved component which forms the tubular body of the curved tubular element, a final step in which, after the cast material is solidified, the curved tubular element thus obtained is extracted from said forming mold.

What is obtained is therefore one or more curved reinforcement components, with a section partly or also circular, which are incorporated on the inner surface, inside the outer curved tubular body.

In a variant form of embodiment, the first curved component comprises at least a centering element which extends radially toward the mold and is suitable to define the casting chamber which subsequently will be filled with cast metal material to form the outer tubular body, and to keep the first curved reinforcement component in position in the casting mold during the casting and solidification operations. Indeed, when in position, the centering element extends completely inside the tubular body, and after solidification remains incorporated in it, anchoring it permanently.

According to another secondary characteristic, each first reinforcement component develops longitudinally along a longitudinal axis of the tubular body substantially for the whole of its length.

According to another secondary characteristic, a plurality of curved reinforcement components are longitudinally disposed equidistant with respect to each other along a longitudinal axis of the tubular body.

According to a variant of the method, the third step of making the tubular body comprises a step of making a first part, facing toward the extrados, and in which the first curved reinforcement component is incorporated, a step of making a second part of the tubular body, facing toward the intrados, and a step of connecting the first part and the second part along the whole longitudinal extension.

The curved tubular reinforcement component, according to a secondary characteristic of the invention, has a variable thickness which is at its maximum near the extrados of the tubular body and reduces in a circumferential direction toward the intrados of the tubular body. In this way the thickness of the curved reinforcement component is substantially proportional to the wear, which is greatest near the extrados.

In another variant form of embodiment, the curved reinforcement component comprises at least a reinforcement insert which covers a determinate angular sector of the cross section of the tubular body and is disposed near the extrados of the tubular body.

It is advantageous to provide that the reinforcement insert is disposed substantially symmetrical with respect to a plane passing through both the extrados and the intrados of the tubular body.

In a variant form of embodiment, the reinforcement insert develops for an angle of the angular sector comprised between 90° and 240°, preferably between 90° and 180°.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME PREFERENTIAL FORMS OF EMBODIMENT

Figure 1:
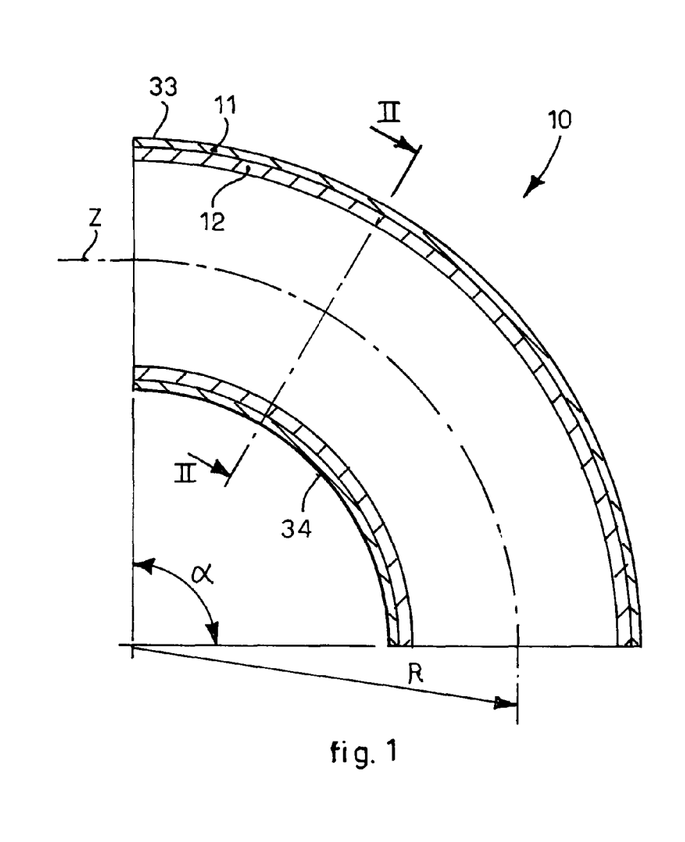
FIG. 1 is a section view of a curved tubular element according to the present invention.

With reference to FIG. 1, a curved tubular element 10, for conveying abrasive materials such as concrete or suchlike, according to the present invention comprises a tubular body 11, or outer body, and an inner curved reinforcement component, in this case a second body 12 which is directly present inside the tubular body 11.

The outer tubular body 11 is preferably made of metal material such as carbon steel or light alloys based on aluminum or other materials.

To give a non-restrictive example, the outer tubular body 11 is made of aluminum and has an inner diameter of about 125 mm, its thickness is about 7 mm, and it has a mean radius of curvature R of about 240 mm.

The second inner body 12 is made of wear-resistant material such as for example ceramic materials, high resistance steels, cast iron, chrome carbides or other types of carbides, and has a higher melting temperature than the material of which the tubular body 11 is made.

The outer tubular body 11 (FIG. 2) has a substantially annular cross section, which extends, concentric to a longitudinal axis Z (FIG. 1), for an angle of longitudinal development α, which in this case is 90°.

The longitudinal axis Z in this case has the shape of an arc of a circle, with a radius of curvature R.

Figure 2:
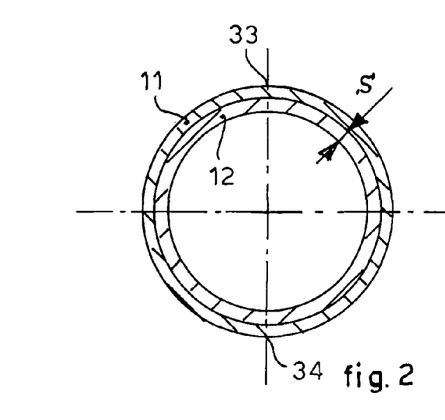
FIG. 2 is a section view from II to II of FIG. 1.

The cross section of the outer tubular body 11 has a substantially uniform thickness along the whole of its circumferential extension.

Figure 3:
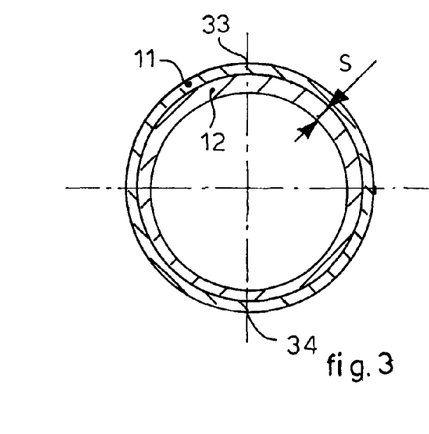
FIG. 3 is a section view of a variant of FIG. 2 of the curved tubular element.

The second inner body 12, inside the cross section of the outer tubular body 11, also has a practically uniform thickness S, although in other forms of embodiment (FIG. 3), the thickness of the second inner body 12 can vary, along the circumferential extension, assuming a maximum value near the extrados 33, that is, the point of maximum wear of the pipe, and a minimum value near the intrados 34 of the curved tubular element 10.

The method to make the curved tubular element 10 (FIG. 4) provides to make the second inner tubular body, which can also be referred to as a first curved component, 12 using known methods, a subsequent step of inserting the second tubular body 12 inside a casting mold 16 and a subsequent step of making the outer tubular body, which can also be referred to as a second curved component, 11 by casting metal material.

Figure 4:
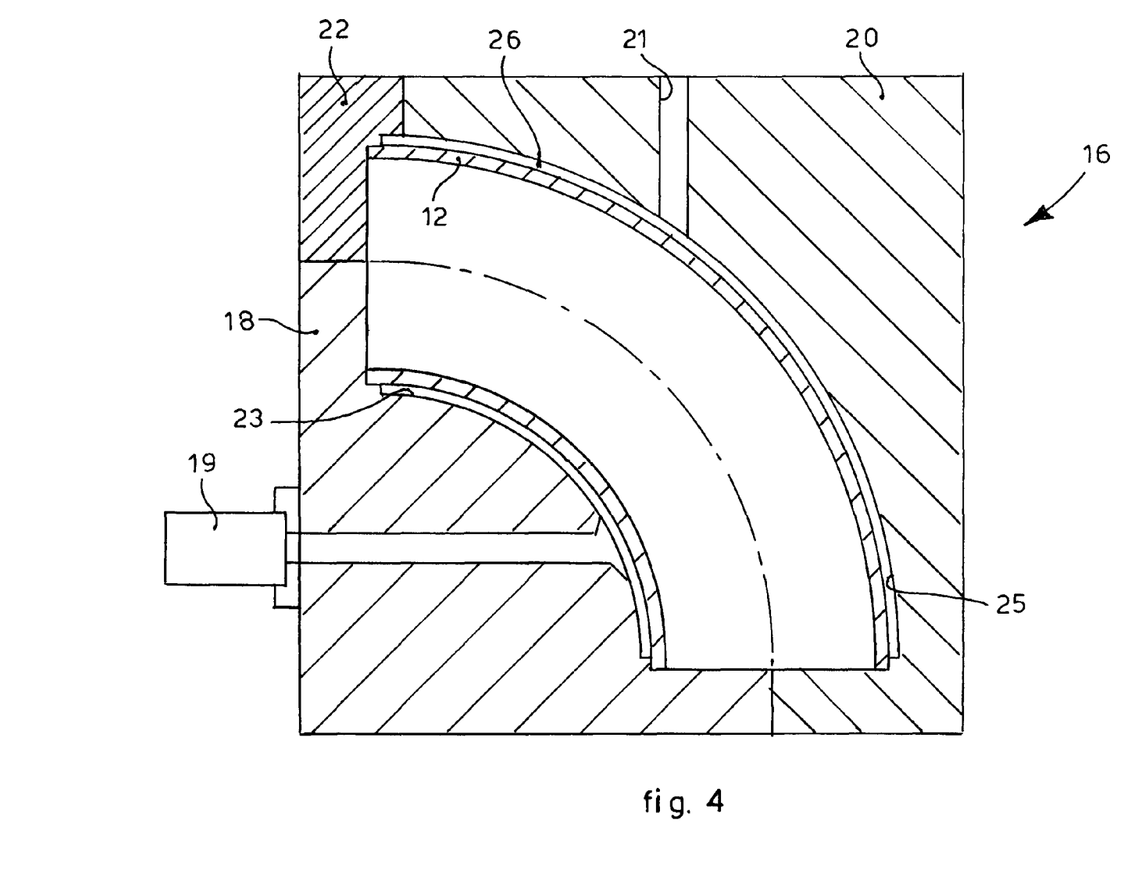
FIG. 4 is a schematic representation of a step in the method to make a curved tubular element according to the present invention.

In particular, the step of inserting the second inner body 12 provides to dispose it inside the casting mold 16, which comprises a lower part 18 provided with extraction means 19 to extract the tubular element 10, an upper part 20 comprising a casting channel 21 and an undercut element 22.

In particular, the lower part 18 and the upper part 20 of the casting mold 16 define respectively a first molding surface 23 and a second molding surface 25, which have the negative shape of the outer surface respectively of the intrados 34 and the extrados 33 of the tubular element 10 to be obtained.

The first 23 and the second molding surface 25, together with the outer surface of the second inner body 12, define a casting chamber 26.

The second inner body 12 therefore acts as a core for the subsequent casting step and for the formation of the outer tubular body 11, also thanks to the fact that it has a higher melting temperature than that of the outer tubular body 11.

The step of forming the tubular element 10 provides to fill the casting chamber 26 by casting material in the molten state through the casting channel 21, until it is completely filled.

After the cast material has solidified, the extraction means 19 provide to extract the tubular element 10.

Subsequently, other operations can be carried out, such as for example burring, painting, processes to protect it from oxidation or other operations.

In another form of embodiment (FIG. 5), the tubular element 10 is completely similar to the one described above, except that the second inner body 12, on its outer surface, both near its intrados 34 and near its extrados 33, comprises centering elements 29 of a substantially cylindrical shape that extend toward the outside.

Figure 5:
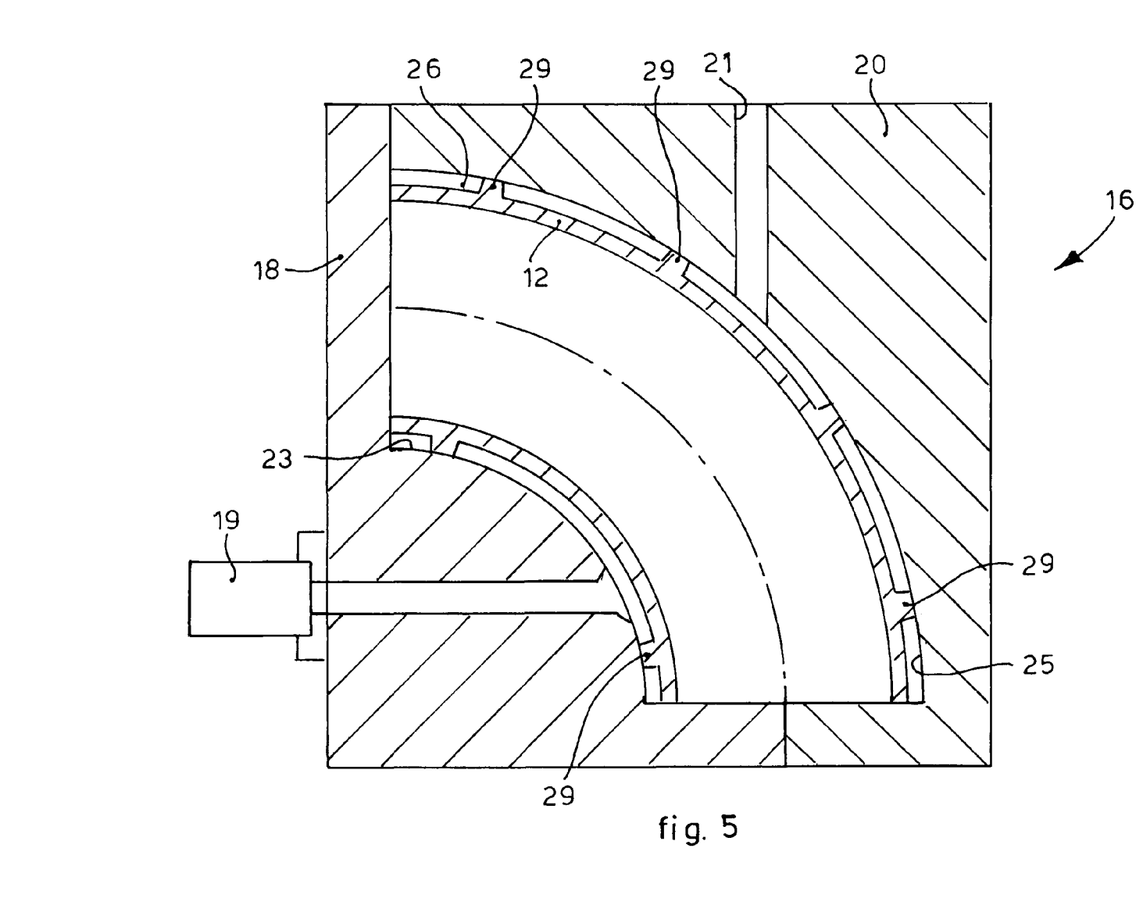
FIG. 5 is a representation of a variant of FIG. 4.

It is clear that in other forms of embodiment, the centering elements 29 can be disposed only near the extrados 33.

The centering elements 29 are made in a single piece with the second inner body 12, even if in other forms of embodiment it is possible to provide that they are attached to the outer surface thereof using known methods, such as for example by threaded connections.

The centering elements 29 allow to keep the second inner tubular body 12 in the desired position, to define the casting chamber 26 for the subsequent formation of the outer tubular body 11, and to keep the second inner body 12 well anchored with respect to the outer tubular body 11 when in position.

In this case, moreover, the casting mold 16 does not need the undercut element 22 to allow the tubular element 10 to be removed.

In other forms of embodiment, not shown in the drawings, the second inner body 12 may comprise several tubular components which are adjacent to each other, or separated.

In another form of embodiment, a curved tubular element (FIGS. 6 and 7) according to the present invention is indicated in its entirety by the reference number 110 and comprises a curved tubular body 111 having an inner surface 113 on which, near the extrados 133, three curved components are disposed, integrated, in this case reinforcement inserts 112.

Figure 6:
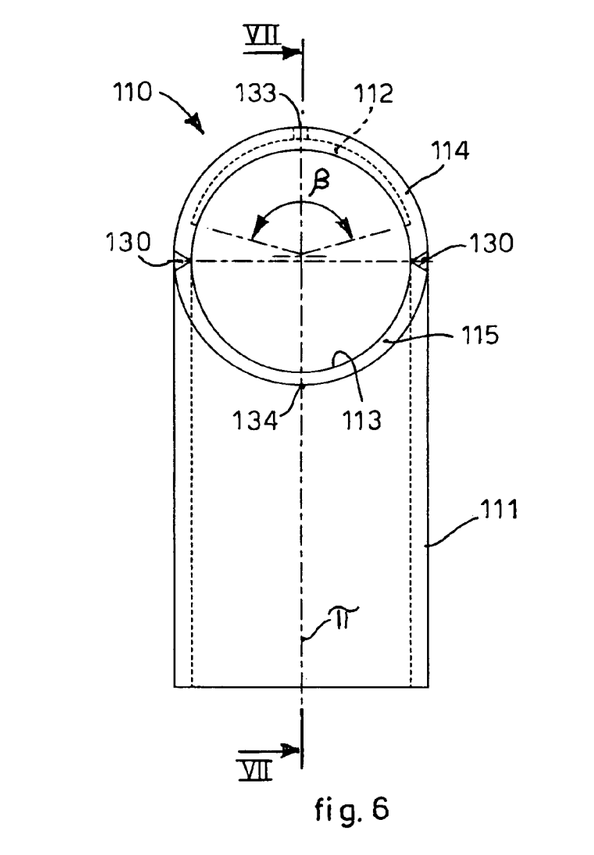
FIG. 6 is a front view of a curved tubular element according to a variant of FIG. 1.
Figure 7:
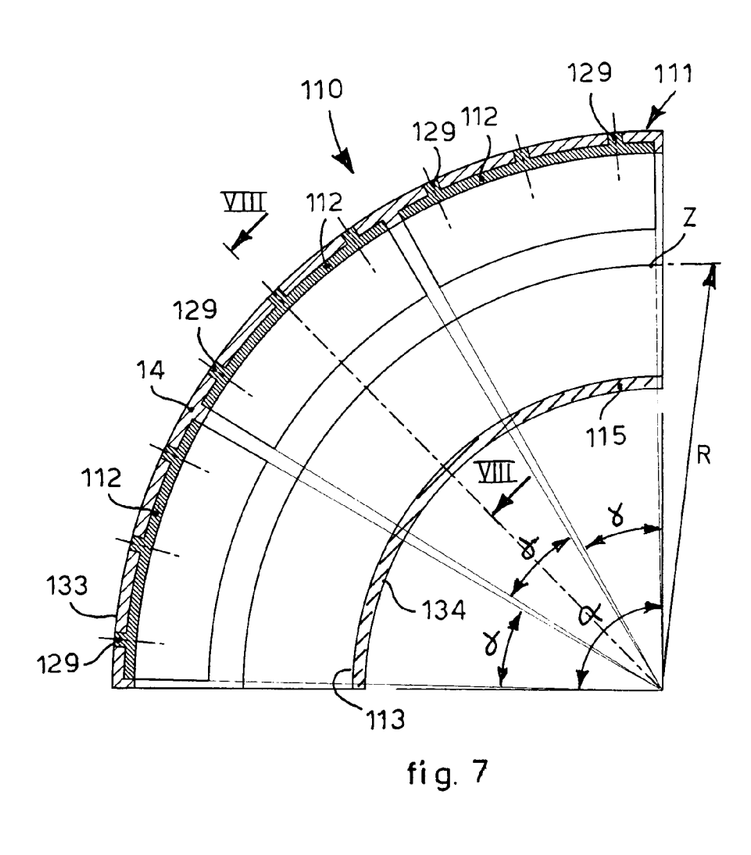
FIG. 7 is a section view from VII to VII of FIG. 6.

In the same way as described above, the tubular body 111 extends along a longitudinal axis Z in the shape of an arc of a circle having a radius of curvature R, which in turn divides the tubular body 111 into two parts, that is, a first part 114, more external and facing toward the extrados 133, and a second part 115, more internal and facing toward the intrados 134 of the tubular body 111.

In this case, the first part 114 and the second part 115 are made in two separate pieces which are then welded near the mean radius of curvature R, along two welding beads 130.

The inserts 112, made of the same materials as indicated above for the second inner body 12, are disposed equidistant with respect to each other along the longitudinal direction and in a symmetrical position with respect to a plane of symmetry $\pi$ (FIG. 6) passing both through the extrados 133 and also through the intrados 134 of the curved tubular element 110.

Figure 8:
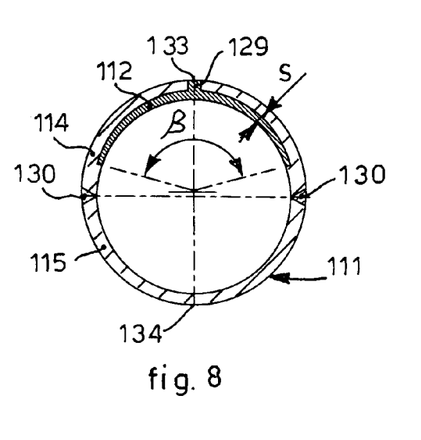
FIG. 8 is a section view from VIII to VIII of FIG. 7.

Each insert 112 has a substantially C-shaped cross section (FIG. 8), which extends with a determinate angular sector or circumferential development for an angle $\beta$ of an amplitude comprised between 90° and 360°, advantageously between 120° and 180°.

In particular (FIG. 8), in this case the inserts 112 extend circumferentially only in the first part 114, near the extrados 133, for an angle $\beta$ of about 160°.

According to a variant of the invention (FIG. 9), the inserts 112 extend circumferentially both in the first part 114 and also, although partly, in the second part 115 of the tubular body 111, and therefore the angle $\beta$ is greater than 180°, in this case 240°.

Figure 9:
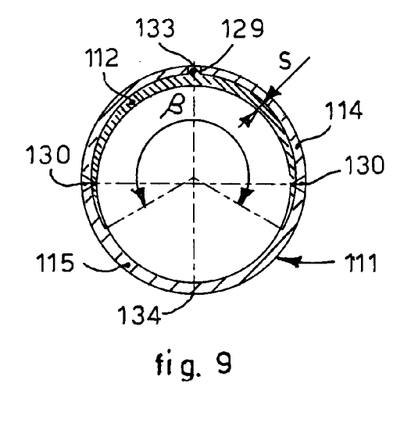
FIG. 9 is a section view of a variant of FIG. 8 of the curved tubular element.

The thickness S of the inserts 112 is variable in a circumferential direction, for example between 5 mm and 10 mm, it has a maximum value near the extrados 133 of the tubular body 111 and gradually reduces toward the intrados 134.

The shape of the cross section of each insert 112 is mating with the shape of the inner surface 113 of the tubular body 111 so that, when in position, the insert 112 is completely integrated inside the tubular body 115.

Each insert 112 (FIG. 7), furthermore, in a longitudinal direction, extends along the longitudinal axis Z, for an angle $\gamma$ which is a sub-multiple of the angle of longitudinal development $\alpha$ of the tubular body 111.

Each insert 112, on its outer surface, that is, near the extrados 133, has centering elements 129, in this case three, substantially cylindrical in shape, which extend toward the outside in a substantially radial direction.

The method to make the curved tubular element 110 as described heretofore provides a first step of making, by casting, the first part 114 of the tubular body 111, in which the inserts 112 are also incorporated, a second step of making the second part 115 of the tubular body 111 by casting, and a third step in which the first part 114 and the second part 115 are welded together.

The first step provides initially a sub-step to make the inserts 112, using known methods, a sub-step of positioning the inserts 112 in a casting mold 116 (FIG. 10), and a subsequent casting sub-step to make the tubular body 111 in which the inserts 112 are integrated therein.

Figure 10:
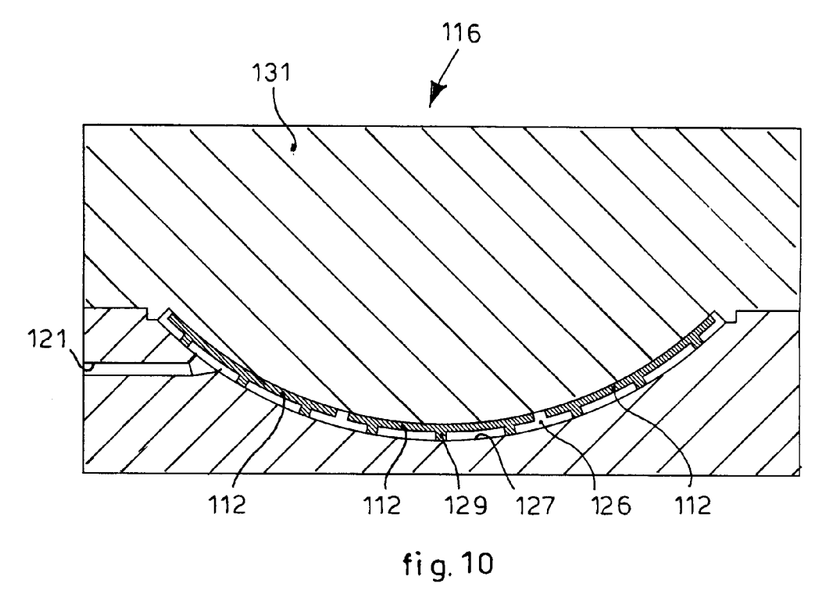
FIG. 10 is a schematic representation of a step in the method to make the curved tubular element in FIG. 7.

The casting mold 116 has a curved molding surface 127 of a shape mating with that of the first part 114 of the tubular body 111.

In the positioning step, the inserts 112 are disposed inside the casting mold 116, with the centering elements 129 facing toward the curved surface 127 and in predetermined positions.

The inserts 112 are disposed on the molding surface 127 of the mold 116, suitably distanced from each other so as to compensate for shrinkage and/or dilatation of the tubular body 111 and/or of the inserts 112 during the production of the tubular element 110.

A counter-mold 131, with a shape mating with the inner surface 113 of the first part 114 of the tubular body 111, closes the casting mold 116 and keeps the centering elements 129 in the predetermined position. In this way, thanks to the presence of the centering elements 129, the inserts 112 create a casting chamber 126 inside the casting mold 116 and, thanks to the contrast of the counter-mold 131 and the centering elements 129 on the molding surface 127, they are not subjected to displacements inside the casting mold 116 due to floating effects.

A casting channel 121 provides to cast the material with which the first part 114 of the tubular body 111 is made, in order to completely fill the casting chamber 126 and incorporate the centering elements 129.

The second step provides to make the second part 115 of the tubular body 111 which is also obtained by casting in a mold.

The third step provides to connect, near the mean radius R of the tubular body 111, the first 114 and the second part 115 of the tubular body 111, by welding along the whole longitudinal extension.

It is clear that modifications and/or additions of parts may be made to the curved tubular element 10, 110 for transporting concrete and the relative method as described heretofore, without departing from the field and scope of the present invention.

It is also clear that, although the present invention has been described with reference to some specific examples, a person of skill in the art shall certainly be able to achieve many other equivalent forms of curved tubular element for transporting concrete and the relative method, having the characteristics as set forth in the claims and hence all coming within the field of protection defined thereby.

The invention claimed is:

1. Method to make a curved tubular element in order to convey abrasive materials, the method comprising:

providing at least a first curved component made of a material highly resistant to wear, having an arched transverse development between 90° and 360°, inserting said first curved component, which forms an inner curved reinforcement component of the curved tubular element to be made, into a forming mold provided with a molding surface having a shape mating with an outer surface of at least a part of the curved tubular element to be made, so that, together with said molding surface, an outer surface of said first curved component defines a casting chamber outside the first curved component, casting a metal material with a low resistance to wear in said casting chamber in order to make, externally to said first curved component, and directly in contact therewith, at least a part of a second curved component which forms an outer tubular body of said curved tubular element to be made, and after the cast material is solidified, extracting said curved tubular element while having the inner curved reinforcement component directly present inside the outer tubular body from said forming mold thus obtaining said curved tubular element.

2. Method as in claim 1, wherein said first curved component comprises at least a centering element which extends radially toward the forming mold and is suitable to define said casting chamber.

3. Method as in claim 1, wherein said casting a material with a low resistance to wear comprises making a first part of the outer tubular body, facing toward an extrados, and in which said first curved component is incorporated, making a second part of the outer tubular body, facing toward an intrados, and connecting said first part and second part along an entire longitudinal extension.

* * * * *